United States Patent
Ogawa et al.

(10) Patent No.: US 8,283,885 B2
(45) Date of Patent: Oct. 9, 2012

(54) DRIVER CIRCUIT

(75) Inventors: Takashi Ogawa, Ogaki (JP); Tsutomu Murata, Mizuho (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 294 days.

(21) Appl. No.: 12/821,547

(22) Filed: Jun. 23, 2010

(65) Prior Publication Data
US 2010/0320985 A1    Dec. 23, 2010

(30) Foreign Application Priority Data
Jun. 23, 2009   (JP) ................................. 2009-149052

(51) Int. Cl.
*H02P 5/40*    (2006.01)
*H02P 7/00*    (2006.01)

(52) U.S. Cl. ........ 318/805; 318/798; 318/802; 318/803; 318/806; 318/807; 318/808; 318/809

(58) Field of Classification Search ................... 318/798, 318/802, 803, 805, 806, 807, 808, 809
See application file for complete search history.

(56) References Cited

U.S. PATENT DOCUMENTS

| | | | | |
|---|---|---|---|---|
| 4,456,868 A | * | 6/1984 | Yamamura et al. | 318/800 |
| 4,814,683 A | * | 3/1989 | Okamoto et al. | 318/800 |
| 5,038,092 A | * | 8/1991 | Asano et al. | 318/811 |
| 5,278,485 A | * | 1/1994 | Kim | 318/802 |
| 5,387,855 A | * | 2/1995 | Miyazaki et al. | 318/805 |
| 5,844,397 A | * | 12/1998 | Konecny et al. | 318/811 |
| 7,187,152 B1 | * | 3/2007 | Tsai | 318/400.02 |
| 7,443,127 B2 | * | 10/2008 | Okazaki et al. | 318/722 |

FOREIGN PATENT DOCUMENTS

| | | |
|---|---|---|
| JP | 8-37798 A | 2/1996 |
| JP | 2006-288056 A | 10/2006 |

\* cited by examiner

*Primary Examiner* — Bao Q Vu
(74) *Attorney, Agent, or Firm* — Cantor Colburn LLP

(57) ABSTRACT

A drive control signal is effectively obtained. An offset control circuit (32) adds an offset to a rotational state signal. An added signal is obtained by adding an offset to the rotational state signal by repeating a process in which, when it is detected that an added signal in which a predetermined offset amount is added to the rotational state signal on a side approaching a reference value becomes the reference value from one direction at a first time, the offset amount is added to the rotational state signal in a direction returning from the reference value, when it is detected that the obtained added signal becomes the reference value from the one direction at a second time, no value is added to the signal, and, when it is detected that the added signal becomes the reference value at a first time from another direction which is a direction opposite to the one direction and which reaches the reference value, the offset amount is added to the rotational state signal on a side approaching the reference value. A drive control signal is generated in which the level is reduced compared to the sine wave shape signal for a predetermined period of the obtained added signal between the reference value at the second time and a reference value at a next time.

2 Claims, 5 Drawing Sheets

DRIVER CIRCUIT

CROSS-REFERENCE TO RELATED APPLICATION(S)

The entire disclosure of Japanese Patent Application No. 2009-149052 filed on Jun. 23, 2009, including specification, claims, drawings, and abstract, is incorporated herein by reference in its entirety.

BACKGROUND

1. Technical Field

The present invention relates to a driver circuit which generates a drive control signal based on a rotational state signal of a sine wave shape which indicates a rotational state of a motor.

2. Related Art

There exist various motors, and a stepping motor is known as a representative motor which can accurately determine a position and is widely in use in various devices. For example, the stepping motor is used in focusing in a camera, shaking correction, and positioning of a machine tool.

The drive of the stepping motor is normally achieved by changing a rotational position of a rotor with current phases to two stator coils.

There is a demand for minimizing power consumption in an electrical device. In particular, this demand is high in a portable device which is driven with a battery. In driving of the stepping motor, the currents supplied to two coils differ in phase by 90 degrees from each other, and when one coil current is around 0 degrees or 180 degrees, a sufficient current flows in the other coil, and the currents around 0 degrees and 180 degrees do not significantly contribute to motor driving. Thus, a method of applying electricity is proposed in which the currents around 0 degrees and 180 degrees of the motor driving current are cut. For example, a method of applying electricity in which the application of electricity is cut for 30 degrees around 0 degrees and 180 degrees is known as 150-degree electricity application.

In order to execute the 150-degree electricity application, a circuit for generating a signal for such a configuration is required. There is also a demand for simplifying this circuit.

SUMMARY

According to one aspect of the present invention, there is provided a driver circuit which generates a drive control signal based on a rotational state signal of a sine wave shape which indicates a rotational state of a motor, wherein an added signal is obtained by adding an offset to the rotational state signal by repeating a process in which, when it is detected that an added signal in which a predetermined offset amount is added to the rotational state signal on a side approaching a reference value becomes the reference value from one direction at a first time, the offset amount is added to the rotational state signal in a direction returning from the reference value, when it is detected that the obtained added signal becomes the reference value from the one direction at a second time, no value is added to the signal, and, when it is detected that the added signal becomes the reference value at a first time from another direction which is a direction opposite from the one direction and which reaches the reference value, the offset amount is added to the rotational state signal on the side approaching the reference value, and a drive control signal is generated having an electricity application period from a time when the obtained added signal becomes the reference value at the second time until a time when the obtained added signal becomes the reference value at a next time.

According to another aspect of the present invention, it is also preferable that, in the driver circuit, a different drive control signal is generated between a time when the added signal is at a positive side and a time when the added signal is at a negative side.

According to various aspects of the present invention, a drive control signal in which the electricity application time is reduced can be obtained with a relatively simple circuit.

BRIEF DESCRIPTION OF THE DRAWINGS

A preferred embodiment of the present invention will be described in further detail based on the following drawings, wherein.

DETAILED DESCRIPTION

Figure 1:
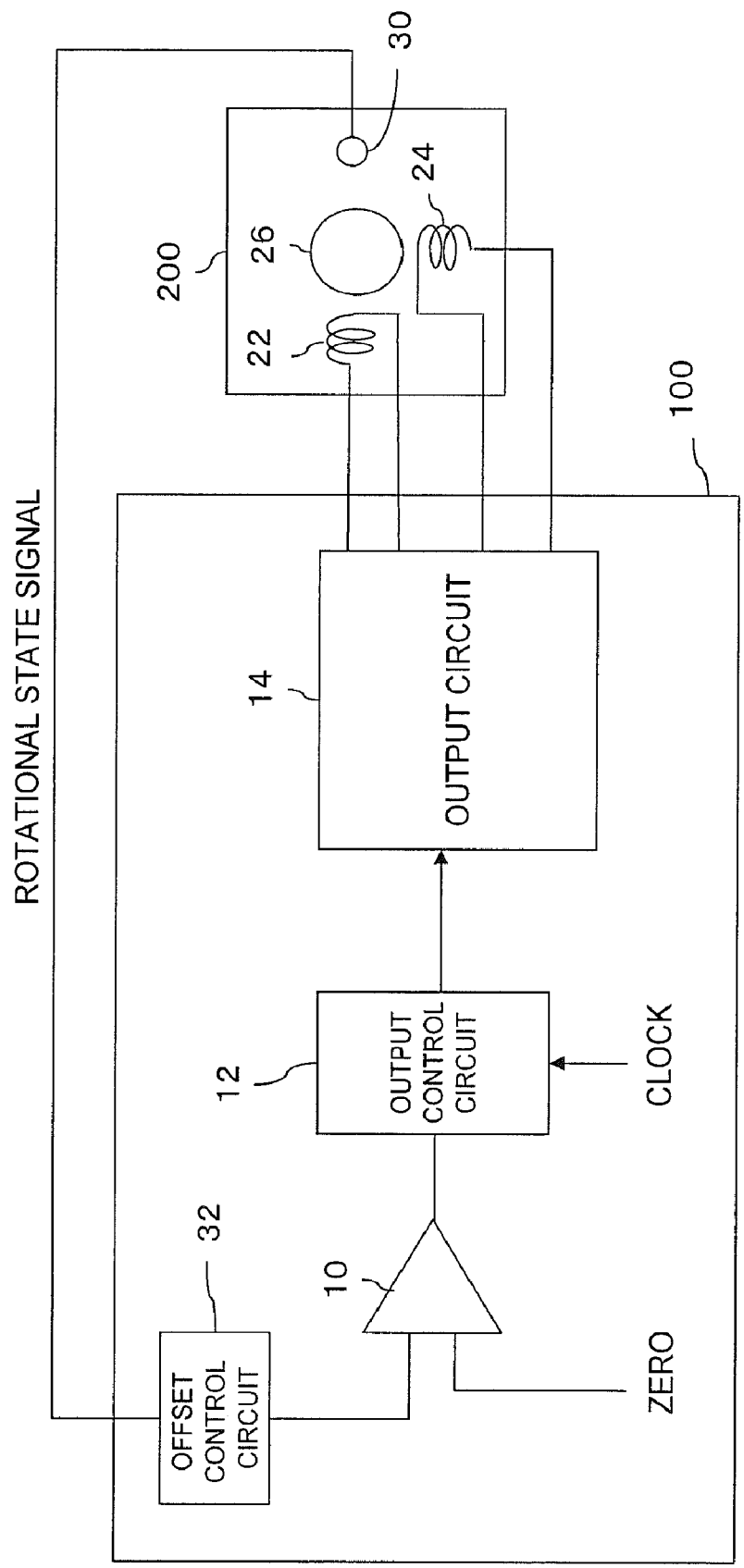
FIG. 1 is a block diagram showing an overall structure.

A preferred embodiment of the present invention will now be described with reference to drawings. FIG. 1 is a diagram showing an overall structure, and a system comprises a driver 100 and a motor 200. An input signal is input to the driver 100, and the driver 100 supplies a drive current corresponding to the input signal to the motor 200. With this structure, a rotation of the motor 200 is controlled according to the input signal.

The driver 100 comprises a comparator 10, and a rotational state signal corresponding to a rotor position from a Hall element 30 provided on the motor 200 is supplied via an offset control circuit 32 to one terminal of the comparator 10. More specifically, the offset control circuit 32 adds a predetermined offset value to the rotational state signal, and obtains an added signal in which the value is alternately shifted in the up and down direction. The added signal is supplied to the one terminal of the comparator 10. A zero voltage (reference value voltage) is supplied to the other terminal of the comparator 10, and the comparator 10 detects that the added signal has reached the zero (reference value).

An output of the comparator 10 is supplied to an output control circuit 12. The output control circuit 12 determines a drive waveform (phase) of a predetermined frequency according to the output signal of the comparator 10, and the drive control signals (OUT1, OUT2) are controlled to be PWM-driven, to determine an amplitude of the drive current. The generated drive control signal is supplied to an output circuit 14.

The output circuit 14 comprises a plurality of transistors, and controls a current from a power supply by switching the plurality of transistors, to generate a motor drive current, and supplies the motor drive current to the motor 200.

Figure 2:
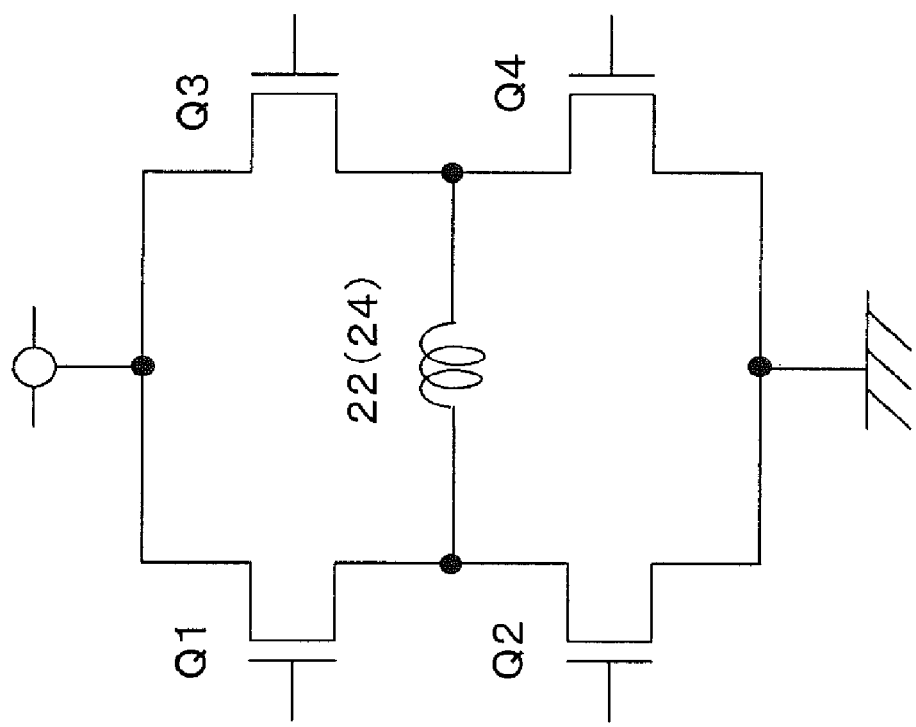
FIG. 2 is a diagram showing an example structure of an output circuit.

FIG. 2 shows a structure of a part of the output circuit 14 and one coil 22 (24) of the motor 200. As shown in FIG. 2, an arm comprising a series connection of two transistors Q1 and Q2 and an arm comprising a series connection of two transistors Q3 and Q4 are provided between the power supply and ground, and the coil 22 (24) is connected between an intermediate point between the transistors Q1 and Q2 and an intermediate point between the transistors Q3 and Q4. The transistors Q1 and Q4 are switched ON and the transistors Q2 and Q3 are switched OFF so that a current of one direction flows in the coil 22 (24), and the transistors Q1 and Q4 are switched OFF and the transistors Q2 and Q3 are switched ON so that a current of an opposite direction flows in the coil 22 (24), to drive the coils 22 and 24.

By providing two circuits having such a structure, it is possible to individually control the currents supplied to the two coils 22 and 24.

The motor 200 is a stepping motor, and comprises two coils 22 and 24, and a rotor 26. The two coils 22 and 24 are placed such that the electric angles are shifted by a position of 90 degrees from each other. Therefore, the directions of magnetic fields with respect to the rotor 26 are also shifted by an electric angle of 90 degrees from each other with respect to the center angle of the rotor. A number of permanent magnets are provided in the rotor 26, the number corresponding to the number of poles, and, for example, an N pole and an S pole are placed at opposing positions (positions differing by 180 degrees from each other). A stable position is determined according to the magnetic fields from the two coils 22 and 24.

Therefore, by supplying an AC current having phases differing by 90 degrees from each other to the two coils placed at positions which are shifted by 90 degrees from each other with respect to the rotational angle of the rotor, it is possible to move and rotate the rotor 26 with the phases of the currents. In addition, by stopping the change of the current phase at a certain timing of the current phase, it is possible to stop the rotor at a position corresponding to the current phase at that point. In this manner, the rotation of the motor 200 is controlled.

The Hall element 30 is provided on the motor 200, and a rotational state signal is generated according to a magnetic field from the permanent magnet of the rotor 26. As described, when there are one N pole and one S pole, a sine wave having a period of one rotation of the rotor 26 is obtained as the rotational state signal.

The rotational state signal from the Hall element 30 is supplied to the offset control circuit 32. The offset control circuit 32 shifts the rotational state signal by a predetermined offset amount, and sets a period between two zero-crosses to, for example, 150 degrees.

Figure 3:
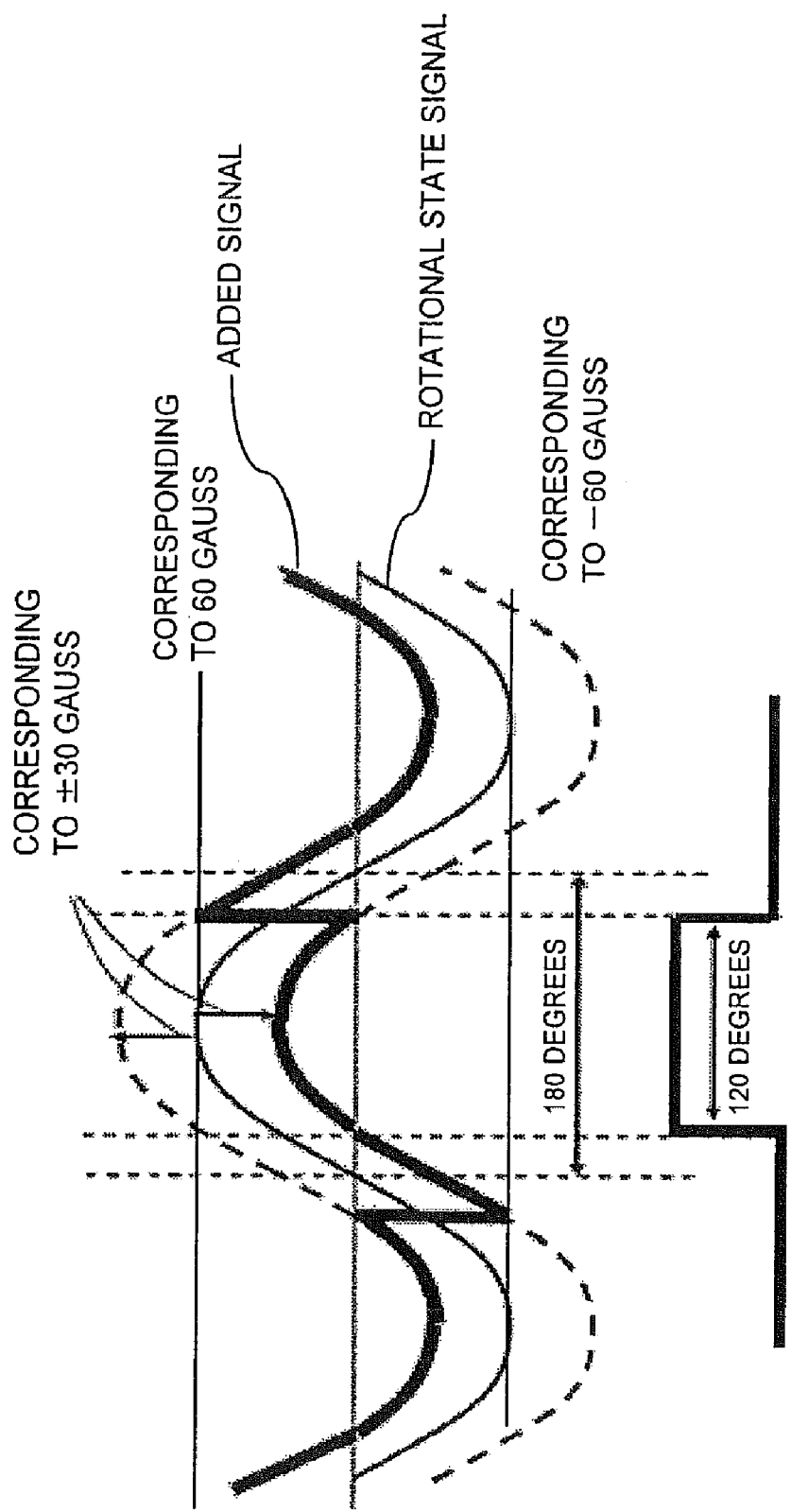
FIG. 3 is a diagram showing an example of an added signal.

FIG. 3 shows an example where the period between the zero-crosses is changed from 180 degrees to 120 degrees. The rotational state signal is a sine wave having a voltage corresponding to 0 Gauss at 0 degree, +60 Gauss at 90 degrees, 0 Gauss at 180 degrees, and −60 Gauss at 270 degrees. Therefore, if the rotational state signal is set closer to zero by a voltage corresponding to 30 Gauss, the period between two zero-crosses would become 120 degrees. In consideration of this, when an added signal in which an amount corresponding to +30 Gauss is added at the negative side (signal in which the rotational state signal is set closer to zero by 30 Gauss) becomes zero at a first time (phase of the rotational state signal −30 degrees), an amount corresponding to −30 Gauss is added (an amount corresponding to 30 Gauss is subtracted) in place of the +30 Gauss. With this process, the added signal is shifted in the negative direction by 60 Gauss. In the case of this example, because the addition of −60 Gauss corresponds to shift of 60 degrees, the added signal becomes zero from the negative side at a second time at a phase of +30 degrees of the rotational state signal. At the time of the second zero, the signal transfers to the positive side with the addition of −30 Gauss unchanged. Next, at the first zero from the positive side, the addition is switched to +30 Gauss. In this manner, the offset amount is switched from +30 Gauss to −30 Gauss at the phase of 330 degrees (−30 degrees) of the rotational state signal, the offset amount is switched from −30 Gauss to +30 Gauss at the phase of 150 degrees, and this process is repeated, so that a signal can be obtained in the added signal in which the period between the second zero and the next zero is 120 degrees. By adjusting the offset amount to be added (in this case, the offset amount is set to a value corresponding to ±15 Gauss), it is possible to obtain a signal with an electricity application period such as 150 degrees.

Alternatively, a configuration may be employed in which a voltage of the same potential as a common voltage of the Hall element 30 is supplied as the reference to the other terminal of the comparator 10. With such a configuration, the reference values used in the Hall element 30 and the comparator 10 can be set equal to each other, and the electricity application period to the coils 22 and 24 can be more accurately set.

Figure 4:
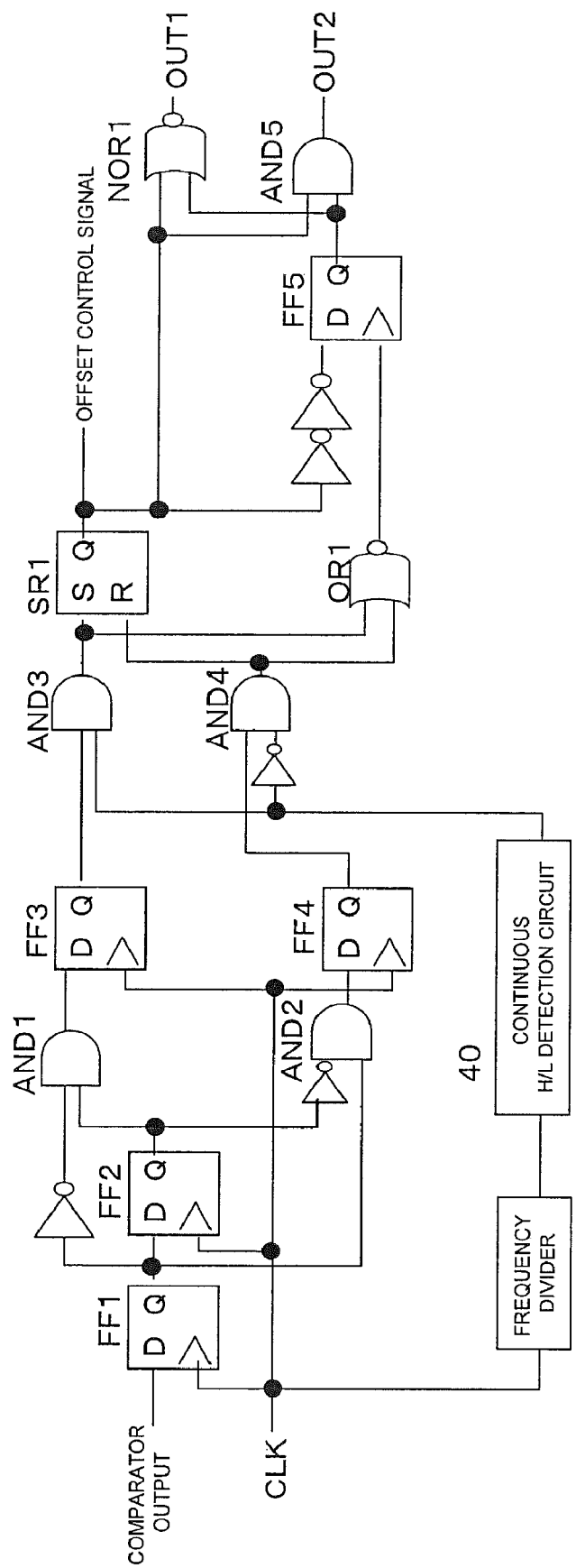
FIG. 4 is a diagram showing an example structure of an output control circuit.
Figure 5:
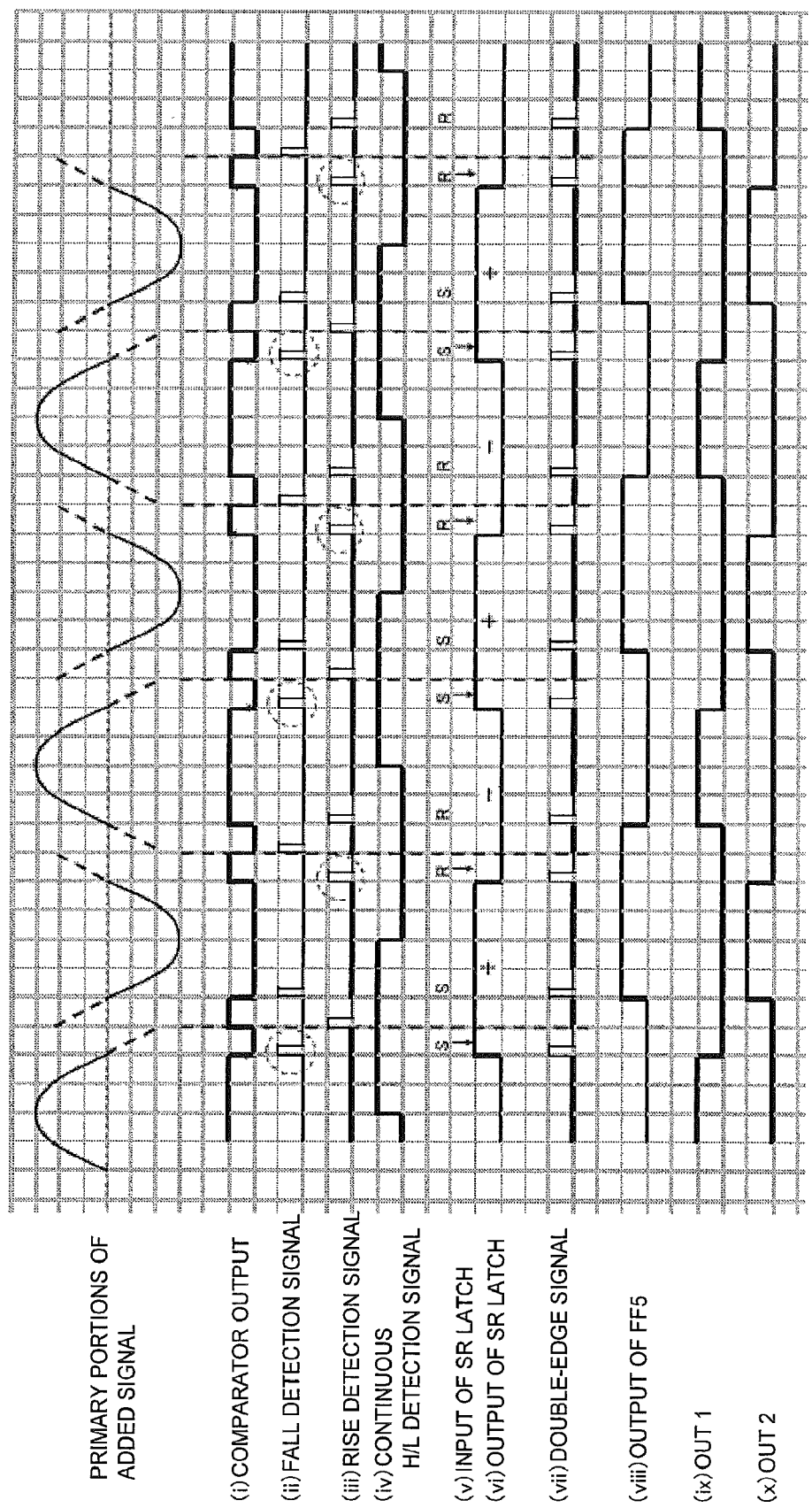
FIG. 5 is a diagram showing signal waveforms of various sections of an output control circuit.

FIG. 4 shows an example structure of the output control circuit 12, and FIG. 5 shows signal waveforms of various sections. The output of the comparator 10 (comparator output) is a signal for detecting the zero-cross of a signal in which the rotational state signal is sequentially shifted in the above-described manner, and in this example, similar to FIG. 3, a 120-degree electricity application is exemplified. The comparator output is a signal which is at the L level between 0 degrees and 30 degrees of the rotational state signal, at the H level between 30 degrees and 150 degrees, at the L level between 150 degrees and 180 degrees, at the H level between 180 degrees and 210 degrees, at the L level between 210 degrees and 330 degrees, and at the H level between 330 degrees and 360 degrees ((i) in FIG. 5).

The comparator output is supplied to a D input terminal of a flip-flop FF1. A predetermined clock CLK is supplied to a clock input terminal of the flip-flop FF1, and the flip-flop FF1 sequentially holds the output of the comparator 10. Because the clock CLK has a frequency which is higher than that of the change of the output of the comparator 10, the flip-flop FF1 reads the output of the comparator 10 with a delay of a predetermined period. The output of the flip-flop FF1 is supplied to a D input terminal of a flip-flop FF2, and the clock CLK is supplied to a clock input terminal of the flip-flop FF2. Therefore, the output of the flip-flop FF2 is a signal which is delayed by one period of the clock CLK compared to the output of the flip-flop FF1. The output of the flip-flop FF1 is inverted and input to an AND gate AND1, and the output of the flip-flop FF2 is input to the AND gate AND1 without any processing. Therefore, the output of the AND gate AND1 is a signal which rises for one period of the clock CLK when the output of the comparator 10 falls.

That is, as shown by a fall detection signal of (ii) in FIG. 5, a signal which rises for one period of the clock CLK at the fall of the comparator output is obtained at the output of the AND gate AND1.

The output of the flip-flop FF1 and an inverted output of the flip-flop FF2 are input to the AND gate AND2. Therefore, as shown by the rise detection signal of (iii) in FIG. 5, a signal which rises for one period of the clock CLK at the rise of the comparator output is obtained at the output of the AND gate AND2.

After the frequency of the clock CLK is divided in a predetermined manner, the clock CLK is input to a continuous H/L detection unit 40. The continuous H/L detection unit 40 is set, for example, to the L level when the H level or the L level is continued for a period of 60 degrees because the H level in the comparator output is continued for the period of 60 degrees. Therefore, in this example configuration, a signal which is set to H level in the period from 90 degrees to 270 degrees of the rotational state signal and to L level in the remaining half period is obtained as the output of the continuous H/L detection unit 40 ((iv) in FIG. 5).

The output of the AND gate AND1 is supplied to a D input terminal of a flip-flop FF3, and an output of the AND gate AND2 is supplied to a D input terminal of a flip-flop FF4. The clock CLK is supplied to clock input terminals of the flip-flops FF3 and FF4. Therefore, the outputs of the AND gates AND1 and AND2 are read by the flip-flops FF3 and FF4. Outputs of the flip-flops FF3 and FF4 are input to AND gates AND3 and AND4, respectively. The continuous H/L detection signal is input without processing to the other input terminal of the AND gate AND3, and an inverted signal of the continuous H/L detection signal is input to the other input terminal of the AND gate AND4. Therefore, in the output of the AND gate AND3, a pulse corresponding to 0 degrees of the rotational state signal in the fall detection signal is removed, and only the pulses of 150 degrees and 210 degrees remain. Similarly, in the output of the AND gate AND4, a pulse corresponding to 180 degrees of the rotational state signal in the rise detection signal is removed, and only pulses of 30 degrees and 330 degrees remain.

The output of the AND gate AND3 is supplied to a set input terminal of an SR latch circuit SR1, and the output of the AND gate AND4 is supplied to a reset input terminal of the SR latch circuit SR1 ((v) in FIG. 5). Therefore, as shown on (vi) in FIG. 5, an offset control signal which is set to the H level at the rotational state signal of 330 degrees and to the L level at 150 degrees is obtained at an output of the SR latch SR1. The output of the SR latch SR1 is supplied to the offset control circuit, and is used for switching control in which a predetermined offset value (corresponding to 30 Gauss) is added to the rotational state signal when the output is at the H level and the predetermined offset value (corresponding to 30 Gausses) is subtracted from the rotational state signal when the output is at the L level.

The outputs of the AND gates AND3 and AND4 are input to an OR gate OR1. At an output of the OR gate OR1, a double-edge signal having four pulses at 330 degrees, 30 degrees, 150 degrees, and 210 degrees is obtained ((vii) in FIG. 5). The offset control signal is applied a predetermined delay and supplied to a D input terminal of a flip-flop FF5. The double-edge signal from the OR gate OR1 is supplied to a clock input terminal of the flip-flop FF5, and a signal which is set to the H level at the rotational state signal of 30 degrees and to the L level at 210 degrees is obtained at an output of the flip-flop FF5 ((viii) in FIG. 5).

The output of the flip-flop FF5 is input to a NOR gate NOR1 and an AND gate AND5, and the output of the SR latch SR1 is supplied to the other input terminal of each of the NOR gate NOR1 and the AND gate AND5. Therefore, at an output of the NOR gate NOR1, a drive control signal OUT1 which is set to the H level only during a period from 30 degrees to 150 degrees ((ix) in FIG. 5) is obtained, and, at an output of the AND gate AND5, a drive control signal OUT2 which is set to the H level only in the period from 210 degrees to 330 degrees ((x) in FIG. 5) is obtained.

By supplying the drive control signals OUT1 and OUT2 to the output circuit 14, it is possible to control switching ON and OFF of the transistors Q1 and Q4 and transistors Q3 and Q2 in FIG. 2, to achieve the drive current control of the coil 22 (24) as described above.

In the output circuit 14, signals which differ from each other in phase by 90 degrees must be supplied to the two coils 22 and 24. For this purpose, two circuits having the above-described structure may be provided. In addition, in the continuous H/L detection unit 40, the signal is read with a delay of an electric phase of 90 degrees. A similar circuit may be provided to delay the above-described drive control signals OUT1 and OUT2 by 90 degrees, to obtain the drive control signal for the other coil.

In addition, in FIG. 1, because the Hall element 30 is placed at an opposing position of the coil 22, a rotational state signal synchronized with the coil 22 is obtained, but the mounting position of the Hall element 30 is not limited. Moreover, as described above, by adjusting the amount of offset to be added or subtracted to or from the rotational state signal, it is possible to easily execute other configurations such as the 150-degree electricity application.

In the control of the present embodiment, the zero-cross must be reliably detected. Therefore, the above-described control may be executed after the rotation is stabilized. With such a configuration, influences of chattering can be prevented, and the electricity application period may be set approximately to the desired period (for example, a period of an electric phase of 150 degrees).

What is claimed is:

1. A driver circuit which generates a drive control signal based on a rotational state signal of a sine wave shape which indicates a rotational state of a motor, comprising:

an added signal generating circuit which obtains a first added signal or a second added signal in which an offset amount is added to the rotational state signal by repeating a process in which, when it is detected that the first added signal in which a predetermined offset amount is added to the rotational state signal on a side approaching a reference value becomes the reference value from one direction at a first time, the offset amount is added to the rotational state signal in a direction returning from the reference value to obtain the second added signal, when it is detected that the obtained second added signal becomes the reference value from the one direction at a second time, no value is added to the signal, and, when it is detected that the second added signal becomes the reference value at a first time from another direction which is a direction opposite from the one direction and which reaches the reference value, the offset amount is added to the rotational state signal on the side approaching the reference value, to obtain the first added signal, and a drive signal generating circuit which generates a drive control signal having an electricity application period from a time when the obtained added signal becomes the reference value at the second time until a time when the obtained added signal becomes the reference value at a next time.

2. The driver circuit according to claim 1, wherein the drive control signal generating circuit generates a different drive control signal between a time when the added signal is at a positive side and a time when the added signal is at a negative side.

* * * * *